United States Patent
Ranaware et al.

(10) Patent No.: US 11,112,041 B2
(45) Date of Patent: Sep. 7, 2021

(54) SWIVEL ASSEMBLY WITH A BOLT AND A HOUSING

(71) Applicant: Eaton Corporation, Cleveland, OH (US)

(72) Inventors: Dipak B. Ranaware, Pune (IN); Ninad C. Landge, Pune (IN); Atul A. Kunte, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 513 days.

(21) Appl. No.: 15/873,201

(22) Filed: Jan. 17, 2018

(65) Prior Publication Data
US 2018/0216763 A1 Aug. 2, 2018

Related U.S. Application Data

(60) Provisional application No. 62/452,050, filed on Jan. 30, 2017.

(51) Int. Cl.
*F16L 27/093* (2006.01)
*F16L 27/087* (2006.01)
*B33Y 80/00* (2015.01)

(52) U.S. Cl.
CPC ........... *F16L 27/093* (2013.01); *F16L 27/087* (2013.01); *B33Y 80/00* (2014.12)

(58) Field of Classification Search
CPC .... F16L 27/093; F16L 27/087; F16L 27/0845
USPC ................................................. 285/190, 275
See application file for complete search history.

(56) References Cited

U.S. PATENT DOCUMENTS

| | | | | |
|---|---|---|---|---|
| 2,459,643 | A | * | 1/1949 | Hartley ................. F16L 27/093 285/190 |
| 2,481,404 | A | * | 9/1949 | Donner ................. F16L 27/093 |
| 3,098,662 | A | * | 7/1963 | Iversen ................. F16L 27/093 285/190 |
| 2004/0202505 | A1 | * | 10/2004 | Pagliai ................. F16L 27/093 |
| 2009/0245926 | A1 | * | 10/2009 | Wei ....................... F16L 27/093 |
| 2012/0181787 | A1 | * | 7/2012 | Mitchell ............... F16L 27/093 |
| 2013/0026743 | A1 | * | 1/2013 | Baca ..................... F16L 27/093 |

FOREIGN PATENT DOCUMENTS

FR 1041914 A * 10/1953 ............ F16L 27/093

OTHER PUBLICATIONS

French Search Report, FR1850726, dated Jan. 17, 2018.

* cited by examiner

*Primary Examiner* — Zachary T Dragicevich
(74) *Attorney, Agent, or Firm* — Fishman Stewart PLLC

(57) ABSTRACT

A swivel assembly including a swivel bolt and housing is disclosed. The swivel bolt may include a first portion, a second portion, and a body portion connecting the first portion and second portion. The second portion may include a transverse channel. The housing may be configured to receive at least a portion of the second portion of the bolt and the housing may include an annular channel operatively aligned with the transverse channel of the swivel bolt. A swivel bolt may be formed as a single piece and/or may be formed using additive manufacturing technology. In embodiments, a swivel bolt may include a fluid passage having a bend with shaped or contoured inner and outer surfaces.

22 Claims, 3 Drawing Sheets

SWIVEL ASSEMBLY WITH A BOLT AND A HOUSING

CROSS-REFERENCE TO RELATED APPLICATION

This application claims the benefit of U.S. Provisional Patent Application Ser. No. 62/452,050, filed on Jan. 30, 2017, the disclosure of which is hereby incorporated herein by reference in its entirety.

TECHNICAL FIELD

The present disclosure generally relates to fluid handling systems including, for example, a swivel assembly for transferring fluid between hoses. Embodiments may, without limitation, be suitable for applications associated with hoses and associated connections, for example and without limitation, to provide improved bleeding, sealing, twisting, pressure drop, structural integrity, and/or weight. Further, embodiments, without limitation, may utilize additive manufacturing technology.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some swivel assemblies may include excess parts, and may involve reduced reliability or increased structural fatigue/failures or leakage pathways. Further, traditional manufacturing processes for such assemblies can require additional operations which can lead to material waste as well as increased part costs and lead time.

There is a desire for solutions/options that minimize or eliminate one or more challenges or shortcomings of swivel assemblies. The foregoing discussion is intended only to illustrate examples of the present field and should not be taken as a disavowal of scope.

SUMMARY

In embodiments, a swivel assembly may comprise a swivel bolt and a housing. The swivel bolt may include a first portion, a second portion, and/or a body portion connecting the first and second portions. The second portion may include a transverse channel. The housing may be configured to receive the second portion of the bolt and may include an annular channel operatively aligned with the transverse channel of the bolt. The swivel bolt may be formed as a single piece. The swivel bolt may be formed using additive manufacturing technology. The swivel bolt may include a passage having a bend with shaped or contoured (e.g., rounded) inner and outer surfaces and/or corners.

In embodiments, a swivel assembly may include a one-piece bolt and a housing that may be formed via additive manufacturing technology.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

Embodiments of the present disclosure will now be described, by way of example, with reference to the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
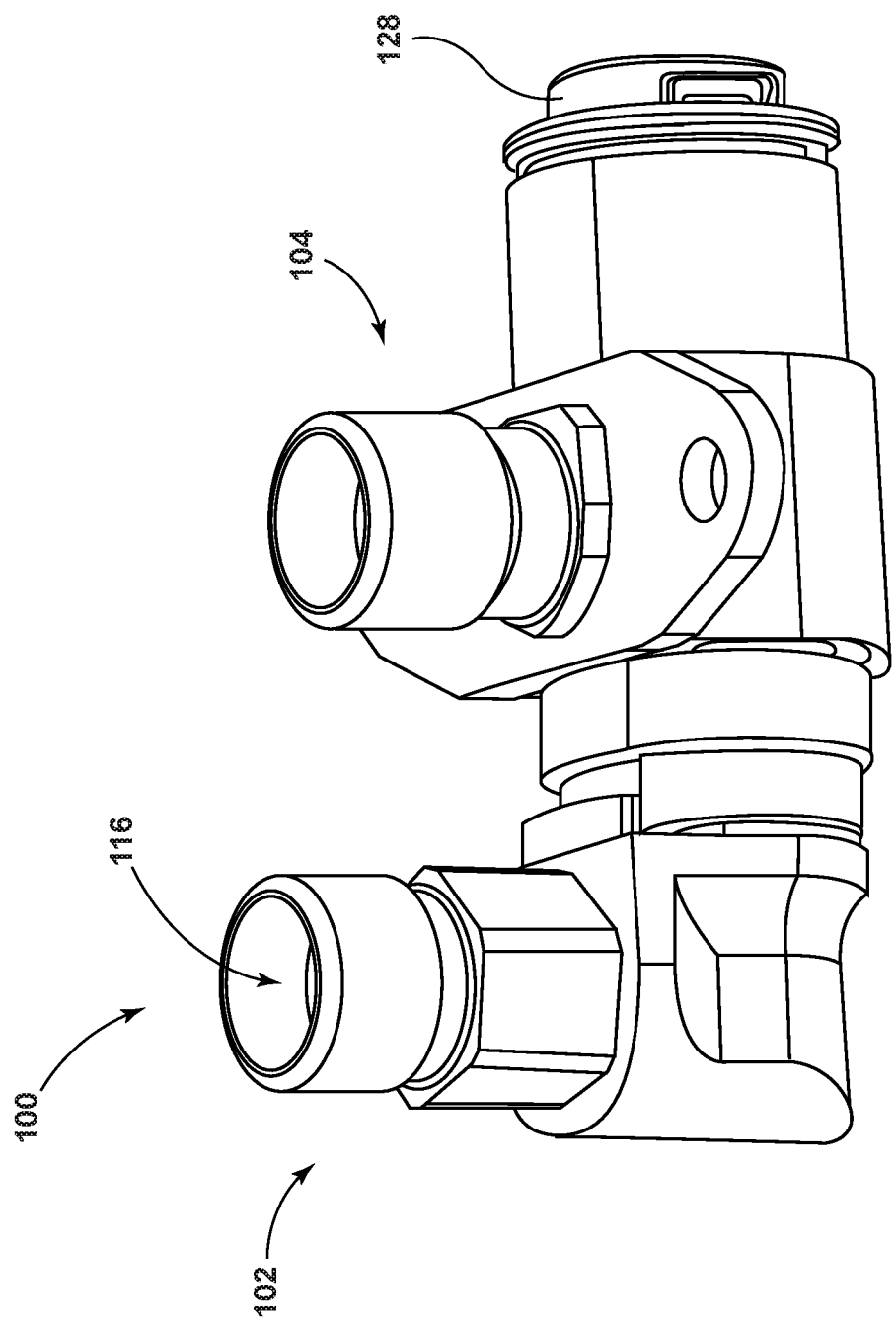
FIG. 1 is a perspective view of a swivel assembly having a swivel bolt and a housing in accordance with embodiments the present disclosure.

In embodiments, such as generally illustrated in FIG. 1, a swivel assembly 100 may include a swivel bolt 102 and a housing 104. The swivel bolt 102 may be configured to be at least partially received in housing 104. The swivel bolt 102 may be connected to a first fluid conduit 202 and/or the housing 104 may be connected to a second fluid conduit 204 (see, e.g., FIG. 4). The swivel assembly 100 may provide a fluid connection between the first and second fluid conduits 202, 204. The swivel bolt 102 and/or the housing 104 may be rotatable, or otherwise repositioned, relative to each other. The swivel assembly 100 may provide approximately 360 degrees swivel motion for fluid conduits connected thereto (e.g., conduits 202, 204), which may reduce and/or prevent excessive bending or twisting of the associated fluid conduits.

With embodiments, a swivel assembly 100 or any portion thereof may be made via additive manufacturing technology or processes. Additive manufacturing technology may include, for example, three-dimensional (3D) printing and/or direct metal laser sintering (DMLS). The swivel bolt 102 may be formed as a monolithic (i.e., unitary and/or single-piece) structure. A swivel bolt 102 may include one or more of a variety of materials. For example and without limitation, a swivel bolt 102 may include stainless steel, such as EOS Stainless Steel PH1 made available by EOS GmbH, which may be utilized in connection with an EOSINT M 280 machine, also made available by EOS GmbH. Additionally or alternatively, the housing 104 may be a monolithic (i.e., unitary and/or single piece) structure. The swivel bolt 102 may include a passage 116 that may include a right angle or ninety (90) degree bend and may include rounded or smooth corners at or about the bend.

With embodiments, various advantages may be appreciated. Additive manufacturing may replace manufacturing processes for traditional swivel assemblies, e.g., turning, boring, milling, and/or electroless nickel plating. The pressure drop in a swivel assembly 100 may be reduced relative to other designs, e.g., by way of a round or smooth radius in the bend of swivel bolt 102, formation of which may be made possible and/or more feasible via additive manufacturing. In other designs, boring of a passage may result in sharp corners that may cause significant disturbance in fluid flow and create increased pressure drops. Additionally or alternatively, the weight of a swivel assembly 100 may be reduced while maintaining structural integrity. The number of parts/components of a swivel assembly 100 may be reduced relative to other designs. For example and without limitation, a swivel assembly 100 may not include a plug, a retaining wire, packing, and/or a retainer. In embodiments, a swivel bolt 102 may provide an integrated retention mechanism and reduce or eliminate leakage pathways. The swivel bolt 102 may provide increased structural integrity and reliability. In addition, the swivel assembly 100 may provide a reduction in overall assembly time.

Figure 2:
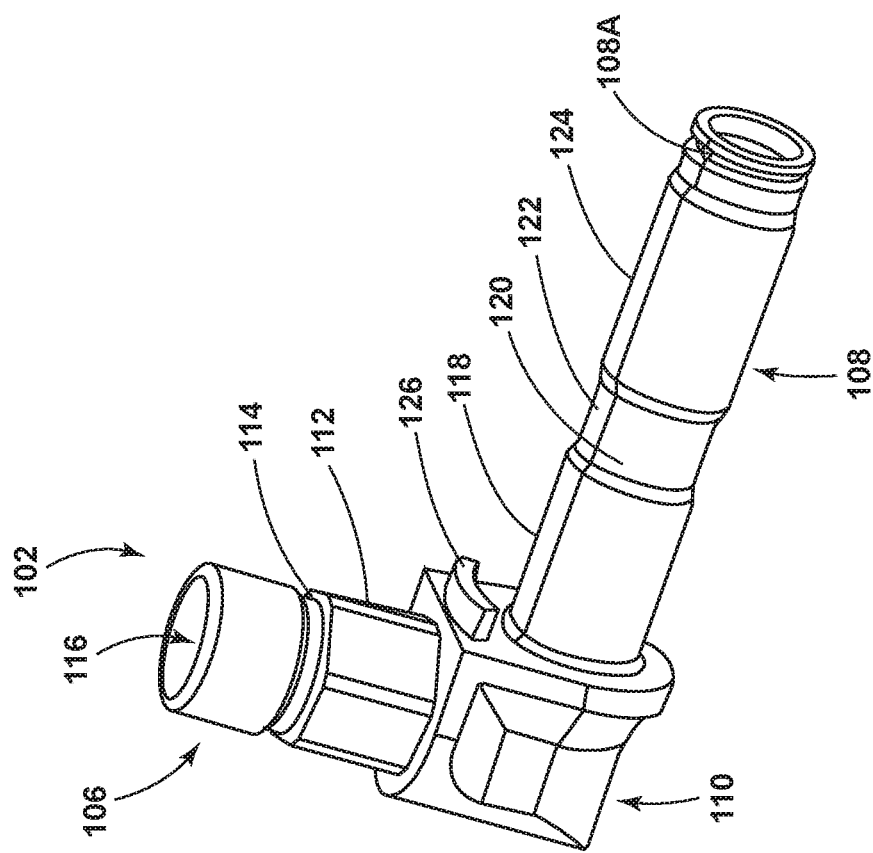
FIG. 2 is a perspective view of a bolt in accordance with embodiments of the present disclosure.

With embodiments, such as generally illustrated in FIG. 2, a swivel bolt 102 may include a first portion 106, a second portion 108, and/or a body portion 110. The body portion 110 may be disposed between and connect the first portion 106 and the second portion 108. The first portion 106, second portion 108, and/or body portion 110 may include a passage 116 therein that may be configured for transferring fluid therethrough. The first portion 106, second portion 108, and/or body portion 110 may be formed as a monolithic, unitary, and/or single-piece structure.

In embodiments, a first portion 106 may extend in a first direction from a body portion 110. The first portion 106 may be configured to transfer fluid between a first fluid conduit 202 and the body portion 110 (see, e.g., FIG. 4). The first portion 106 may include an engagement feature or surface 112, e.g., a polygonal profile such as a hexagonal profile for being engaged by a wrench or another tool. The first portion 106 may include a groove 114 that may be configured to receive a seal therein.

With embodiments, a second portion 108 may extend in a second angle or direction (e.g., transversely) from body portion 110. The second portion 108 may be configured to transfer fluid between the body portion 110 and the housing 104. The second portion 108 may be positioned at about a right angle or about ninety (90) degrees relative to the first portion 106. The second portion 108 may include a proximal portion 118, a recess 120 (e.g., a circumferential recess), and/or a distal portion 124. The first portion 106 may include a flange 126 that may extend substantially perpendicular from the first portion 106. The flange 126 may be shaped or curved and/or may be configured to engage the housing 104. The recess 120 may include one or more transverse channels or apertures 122 that may be substantially transverse or approximately perpendicular to the second portion 108. The transverse channel 122 may extend through an outer wall of the second portion 108 and/or may provide fluid communication between the swivel bolt 102 and the housing 104. The second portion 108 may include a recess 108A that may be configured to receive a retainer 128 (and/or a wire of a retainer 128) therein.

Figure 3:
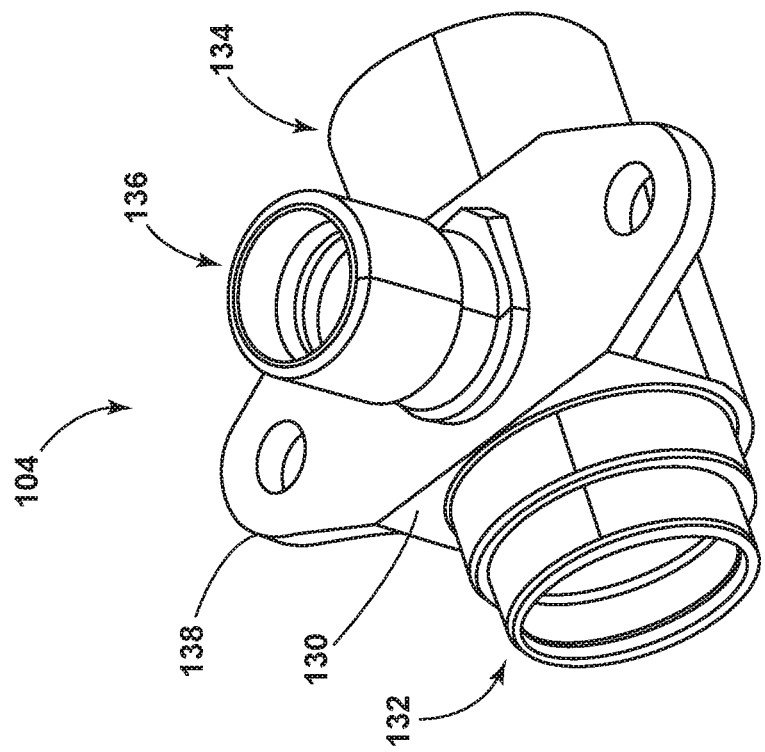
FIG. 3 is a perspective view of a housing in accordance with embodiments of the present disclosure.

In embodiments, such as generally shown in FIG. 3, a housing 104 may include a body portion 130, a first portion 132, a second portion 134, a third portion 136, and/or a mounting support 138. The first portion 132, second portion 134, and/or third portion 136 may extend from the body portion 130. The first portion 132 and the second portion 134 may be coaxially aligned. The first portion 132 and/or second portion 134 may extend in opposite direction from the body portion 130. The third portion 136 may be positioned substantially traverse or perpendicular to the first portion 132 and second portion 134. The first portion 132 and/or the second portion 134 may be configured to receive swivel bolt 102 and permit rotation of swivel bolt 102 relative thereto. The third portion 136 may be configured to provide fluid communication with swivel bolt 102. The mounting support 138 may include a plurality of holes configured to secure the housing 104 relative to another structure.

Figure 4:
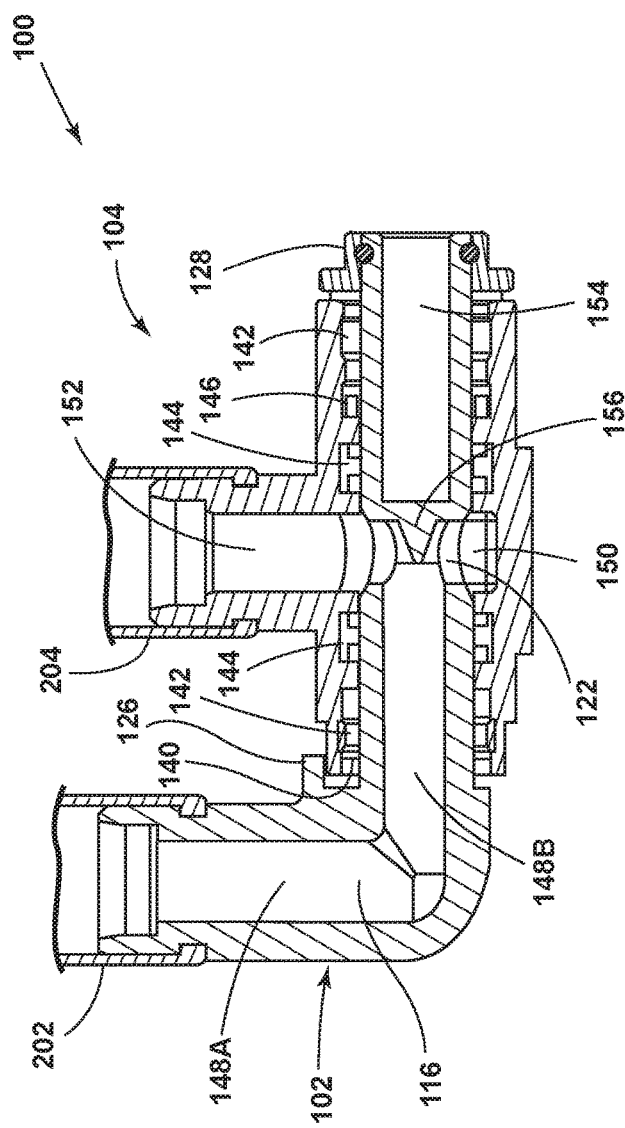
FIG. 4 is a cross-sectional view of a swivel assembly in accordance with embodiments of the present disclosure.

Referring to FIG. 4, in embodiments, a swivel assembly 100 may include a retainer 128. The retainer 128 may be configured to retain at least a portion of the swivel bolt 102 within a portion of the housing 104. The retainer 128 may restrict relative movement of the swivel bolt 102 in an axial direction while allowing rotation of the swivel bolt 102 relative to the retainer housing 104 (for example, about a central axis through second portion 108 of swivel bolt 102).

With embodiments, such as generally illustrated in FIG. 4, a swivel assembly 100 may include one or more components or features that may connect a swivel bolt 102 with a housing 104 (e.g., components 140, 142, 144, 146). Components 140, 142, 144, 146 may include one or more washers, seals, packing, retainers, wire, and/or springs (including any combination thereof). Components 140, 142, 144, 146 may be configured to secure the swivel bolt 102 in an axial direction while allowing rotation thereof, e.g., relative to the housing 104. Components 140, 142, 144, 146 may be configured to seal portions of the swivel assembly 100. Components 140, 142, 144, 146 may be configured to reduce leakage pathways, thereby reducing bleeding and/or increasing sealing.

Referring still to FIG. 4, in embodiments, a swivel assembly 100 may provide fluid communication between a swivel bolt 102 and a housing 104. A swivel assembly 100 may include a first passage portion 148A of a passage 116, a second passage portion 148B of the passage 116, a transverse channel 122, an annular channel 150, a housing passage 152, and/or a cavity 154. A first passage portion 148A, a second passage portion 148B, a transverse channel 122, an annular channel 150, and/or a housing passage 152 may be configured to provide fluid flow therethrough. A housing passage 152 may be disposed substantially perpendicular to second portion 108 of the swivel bolt 102. The housing passage 152 may be in fluid communication with the passage 116 of the swivel bolt, such as via the transverse channel 122 and/or the annular channel 150. A cavity 154 may be fluidly isolated from transverse channel 122, such as by way of a wall 156 (e.g., an axial wall). A wall 156 may be integrally formed with swivel bolt 102 and may prevent fluid from entering cavity 154. The wall 156 may be tapered, angled and/or pointed and may extend into the passage 116, such as away from the cavity 154 and/or into second passage portion 148B. The wall 156 may define at least a portion of the passage 116 and/or at least a portion of the cavity 154.

Figure 5:
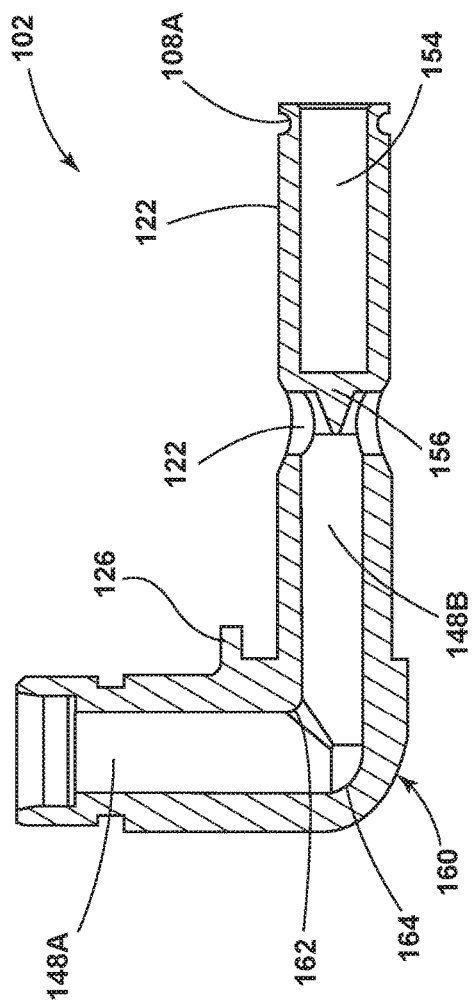
FIG. 5 is a cross-sectional view of a swivel bolt in accordance with embodiments of the present disclosure

With embodiments, such as generally illustrated in FIG. 5, a swivel bolt 102 may be configured for improved (e.g., reduced) pressure drop relative to other designs. A swivel bolt 102 may include a first passage portion 148A with surfaces that may be optimized for fluid flow therein. The first passage portion 148A of swivel bolt 102 may include a bend 160 that may be connected to a second passage portion 148B. The bend 160 may include a profiled inner surface 162 and/or a profiled outer surface 164, e.g., rounded, radiused, smooth, contoured, and/or edgeless corners. Such profiles may be formed with additive manufacturing technology. In embodiments, a rounded bend or corner 160 of a swivel bolt 102 may, for example and without limitation, provide a pressure drop of approximately 0.15 pounds per square inch (PSI), while a sharp or square-edged corner of other designs may experience a pressure drop of approximately 0.51 PSI (e.g., about a 70% improvement).

In embodiments, a swivel assembly 100 or any portion thereof may include materials to optimize its performance and/or weight. For example and without limitation, a swivel bolt 102 and/or a housing 104 may include materials such as stainless steel (e.g., EOS Stainless Steel PH1 that may be utilized in connection with an EOSINT M 280 machine), aluminum, bronze, tooling steel, cobalt chrome, titanium, nickel alloy, and/or a combination thereof. A swivel assembly 100 may be configured for use with high pressure fluids. For example and without limitation, a swivel assembly 100 may be configured for operating pressures of up to or exceeding 5000 psig (pounds per square inch, gage).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

It is intended that all matter contained in the above description or shown in the accompanying drawings shall be interpreted as illustrative only and not limiting. Changes in detail or structure may be made without departing from the present disclosure.

What is claimed is:

1. A swivel assembly, comprising:
a swivel bolt including:
a first portion having a flange extending substantially perpendicular therefrom,
a second portion, and
a body portion connecting the first portion and second portion, the second portion including a transverse channel; and
a housing configured to receive at least a portion of the second portion of the swivel bolt, the housing having an annular channel operatively aligned with the transverse channel of the swivel bolt;
wherein the first portion extends from the body portion in a first direction, and the second portion extends from the body portion in a second direction transverse to the first direction, the flange extending in the second direction and being spaced apart from the second portion in the first direction to define a space between a surface of the second portion and the flange in the first direction, an end portion of the housing being inserted into the space in an insertion direction aligned with the second direction.

2. The swivel assembly of claim 1, wherein the swivel bolt is formed as a monolithic structure.

3. The swivel assembly of claim 1, wherein the swivel bolt is formed via additive manufacturing.

4. The swivel assembly of claim 1, wherein the housing is formed as a monolithic structure.

5. The swivel assembly of claim 1, wherein the swivel bolt includes a fluid passage having a bend with rounded inner and outer profiles.

6. The swivel assembly of claim 5, wherein the second portion of the swivel bolt includes an axial wall forming an axial end of the fluid passage.

7. The swivel assembly of claim 6, wherein the axial wall is tapered or pointed and extends into the fluid passage.

8. The swivel assembly of claim 6, wherein the second portion includes a cavity defined, at least in part, by the axial wall, and the cavity is fluidly isolated from the fluid passage by way of the axial wall.

9. The swivel assembly of claim 1, including a retainer configured to restrict relative movement between the swivel bolt and the housing in an axial direction.

10. The swivel assembly of claim 9, including a plurality of components connecting the swivel bolt with the housing.

11. The swivel assembly of claim 1, wherein an inner radial surface of the flange is curved in a circumferential direction.

12. The swivel assembly of claim 1, wherein the second portion of the swivel bolt includes an axial wall.

13. The swivel assembly of claim 1, wherein the housing includes a housing passage that extends perpendicular to the second portion of the swivel bolt.

14. The swivel assembly of claim 13, wherein the housing passage is in fluid communication with a fluid passage of the swivel bolt.

15. The swivel assembly of claim 13, wherein the housing passage is in fluid communication with a fluid passage of the swivel bolt via the annular channel and the transverse channel.

16. The swivel assembly of claim 11, wherein the inner radial surface flange is configured to engage an outer radial surface of the end portion of the housing.

17. The swivel assembly of claim 1, wherein the flange is configured to restrict movement of the housing in at least one direction.

18. The swivel assembly of claim 1, wherein the second portion of the swivel bolt includes an axial wall; and the first portion, the second portion, and the body portion are formed as a monolithic structure.

19. The swivel assembly of claim 18, wherein the first portion, the second portion, and the body portion are formed of stainless steel via additive manufacturing.

20. The swivel assembly of claim 1, wherein the swivel bolt and the housing are both monolithic components formed of stainless steel via additive manufacturing.

21. A swivel assembly, comprising:
a swivel bolt including:
a first portion having a flange extending substantially perpendicular therefrom,
a second portion, and
a body portion connecting the first portion and second portion, the second portion including a transverse channel; and
a housing configured to receive at least a portion of the second portion of the swivel bolt, the housing having an annular channel operatively aligned with the transverse channel of the swivel bolt;
wherein the swivel bolt includes a fluid passage having a bend with rounded inner and outer profiles, wherein the second portion of the swivel bolt includes an axial wall forming an axial end of the fluid passage, and wherein the axial wall is tapered or pointed and extends into the fluid passage.

22. A swivel assembly, comprising:
a swivel bolt including:
a first portion having a flange extending substantially perpendicular therefrom,
a second portion, and
a body portion connecting the first portion and second portion, the second portion including a transverse channel; and
a housing configured to receive at least a portion of the second portion of the swivel bolt, the housing having an annular channel operatively aligned with the transverse channel of the swivel bolt;
wherein the swivel bolt includes a fluid passage having a bend with rounded inner and outer profiles, wherein the second portion of the swivel bolt includes an axial wall forming an axial end of the fluid passage, and wherein the second portion includes a cavity defined, at least in part, by the axial wall, and the cavity is fluidly isolated from the fluid passage by way of the axial wall.

* * * * *